(12) United States Patent
Han et al.

(10) Patent No.: US 9,100,577 B2
(45) Date of Patent: Aug. 4, 2015

(54) METHOD OF PROVIDING USER INTERFACE AND IMAGE PHOTOGRAPHING APPARATUS APPLYING THE SAME

(71) Applicant: Samsung Electronics Co., Ltd, Suwon-si, Gyeonggi-do (KR)

(72) Inventors: Ju-hee Han, Seoul (KR); Yeon-ha Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 88 days.

(21) Appl. No.: 13/729,486

(22) Filed: Dec. 28, 2012

(65) Prior Publication Data

US 2013/0169840 A1 Jul. 4, 2013

(30) Foreign Application Priority Data

Jan. 2, 2012 (KR) .............................. 2012-0000292

(51) Int. Cl.
*H04N 5/76* (2006.01)
*H04N 5/232* (2006.01)
*G06F 17/30* (2006.01)

(52) U.S. Cl.
CPC ...... *H04N 5/23293* (2013.01); *G06F 17/30265* (2013.01)

(58) Field of Classification Search
CPC .................................................. H04N 5/23293
See application file for complete search history.

(56) References Cited

U.S. PATENT DOCUMENTS

| | | | |
|---|---|---|---|
| 7,716,157 B1 * | 5/2010 | Bourdev et al. ....................... | 1/1 |
| 2007/0081813 A1 * | 4/2007 | Hong et al. .................. | 396/310 |
| 2008/0052945 A1 | 3/2008 | Matas et al. | |
| 2008/0076470 A1 * | 3/2008 | Ueda et al. ................. | 455/556.1 |
| 2008/0313569 A1 * | 12/2008 | Aoki et al. ..................... | 715/838 |
| 2009/0254539 A1 * | 10/2009 | Wen et al. .......................... | 707/5 |
| 2010/0106735 A1 | 4/2010 | Shin | |
| 2011/0157218 A1 * | 6/2011 | Ptucha et al. ................. | 345/619 |
| 2011/0191336 A1 | 8/2011 | Wang et al. | |
| 2011/0282900 A1 * | 11/2011 | Lipson et al. ................. | 707/769 |
| 2012/0079430 A1 | 3/2012 | Kwahk et al. | |
| 2013/0050460 A1 * | 2/2013 | Steinberg et al. ............... | 348/77 |
| 2013/0147987 A1 * | 6/2013 | Matsumoto et al. ........ | 348/231.2 |
| 2013/0314566 A1 * | 11/2013 | Walker et al. ............. | 348/231.3 |
| 2014/0240574 A1 * | 8/2014 | Koda et al. ............... | 348/333.01 |

FOREIGN PATENT DOCUMENTS

| | | |
|---|---|---|
| KR | 2008-0063165 | 7/2008 |
| WO | 2010/143839 | 12/2010 |

OTHER PUBLICATIONS

Extended European Search Report dated Apr. 8, 2013 issued in EP Application No. 13150009.2.
International Searching Authority Written Opinion dated Apr. 29, 2013 issued in International Application No. PCT/KR2012/011845.
International Search Report dated Apr. 29, 2013 issued in International Application No. PCT/KR2012/011845.

* cited by examiner

*Primary Examiner* — Lin Ye
*Assistant Examiner* — John H Morehead, III
(74) *Attorney, Agent, or Firm* — Staas & Halsey LLP (57) ABSTRACT

A method of providing a UI and an image photographing apparatus includes photographing an image, analyzing the photographed image, generating and storing information of the photographed image, and when a user command is input to generate an image search UI, displaying the image search UI that includes a plurality of lists corresponding to a plurality of categories using the information of the photographed image.

38 Claims, 7 Drawing Sheets

METHOD OF PROVIDING USER INTERFACE AND IMAGE PHOTOGRAPHING APPARATUS APPLYING THE SAME

CROSS-REFERENCE TO RELATED APPLICATIONS

This application claims priority under 35 U.S.C. §119(a) to Korean Patent Application No. 10-2012-0000292, filed on Jan. 2, 2012, in the Korean Intellectual Property Office, the disclosure of which is incorporated herein by reference.

BACKGROUND OF THE INVENTION

1. Field of the Invention

The present general inventive concept relates generally to a method of providing a user interface (UI) and an image photographing apparatus applying the same, and more particularly, to a method of providing a UI to search for images photographed according to a plurality of categories and an image photographing apparatus applying the same.

2. Description of the Related Art

With the development of functions of image photographing apparatuses and the increase of storage spaces thereof, the types and the number of image data have been geometrically increased.

In spite of the increase of the number of image data, a user should confirm photographed images one by one in order to search for an image desired by the user among a large number of image data.

Accordingly, it is needed to provide a user with a more convenient image photographing apparatus to perform an image search to find an image desired by the user among photographed images.

SUMMARY OF THE INVENTION

The present general inventive concept provides a method of providing a user interface (UI) and an image photographing apparatus applying the same to provide an image search UI that includes a plurality of lists corresponding to a plurality of categories using information of photographed images.

Additional features and utilities of the present general inventive concept will be set forth in part in the description which follows and, in part, will be obvious from the description, or may be learned by practice of the general inventive concept.

The above and/or other features and utilities of the present general inventive concept may be achieved by providing a method of providing a UI in an image photographing apparatus, the method including photographing an image, analyzing the photographed image, generating and storing information of the photographed image, and when a user command to generate an image search UI is input, displaying the image search UI that includes a plurality of lists corresponding to a plurality of categories using the information of the photographed image.

Each of the plurality of lists may display a search condition menu to change a search condition in the corresponding category and thumbnail images of one or more images that satisfy the search condition changed by the search condition menu.

When the user command is input to generate the image search UI, the search condition in which the number of photographed images is maximized or the search condition in which the number of photographed images is minimized may be selected in the search condition menu.

The plurality of categories may include at least one of a category of the number of persons included in the photographed image, a category of a mode of the photographed image, a category of a photographing position of the photographed image, and a category of setting of the photographed image.

The generating and storing of the information of the photographed image may include analyzing the number of persons included in the photographed image using a face recognition function, and generating and storing information on the number of persons included in the photographed image, and the image search UI may include a list of the category of the number of persons included in the photographed image.

The generating and storing of the information of the photographed image may include analyzing a photographing mode of the photographed image, and generating and storing information on the photographing mode of the photographed image, and the image search UI may include a list of the category of the photographing mode of the photographed image.

The generating and storing of the information of the photographed image may include generating and storing information on a photographing position of the photographed image using GPS (Global Positioning System) information during photographing of the photographed image, and the image search UI may include a list of the category of the photographing position of the photographed image.

The generating and storing of the information of the photographed image may include analyzing the setting information of the photographed image, and generating and storing information on the setting information of the photographed image, and the image search UI may include a list of the category of the setting information of the photographed image.

The method may further include changing at least one of the plurality of lists included in the image search UI to a list corresponding to another category according to a user's operation.

The method may further include, if one of a plurality of thumbnail images displayed on the image search UI is selected, displaying an image corresponding to the selected thumbnail image through a full screen.

The method may further include, if one of a plurality of thumbnail images displayed on the image search UI is selected, storing an image corresponding to the selected thumbnail image in a preset storage area.

The method may further include, if a full search condition command is input, displaying thumbnail images corresponding to an image that satisfies all search conditions of the plurality of categories.

The method may further include, if at least one search condition in the plurality of search condition menus is selected through a user's input and a search command is input, displaying thumbnail images corresponding to one or more images that satisfy the selected search condition.

The above and/or other features and utilities of the present general inventive concept may also be achieved by providing an image photographing apparatus including a photographing unit to photograph an image, a storage unit to store the photographed image and information of the photographed image, a display unit, and a control unit to analyze the image photographed by the photographing unit, to generate the information of the photographed image, and if a user command to generate an image search UI is input, to control the display unit to display the image search UI that includes a plurality of lists corresponding to a plurality of categories using the information of the photographed image.

Each of the plurality of lists may display a search condition menu to change a search condition in the corresponding category and thumbnail images of one or more images that satisfy the search condition changed by the search condition menu.

If the user command is input to generate the image search UI, the search condition in which the number of photographed images is maximized or the search condition in which the number of photographed images is minimized may be selected in the search condition menu.

The plurality of categories may include at least one of a category of the number of persons included in the photographed image, a category of a mode of the photographed image, a category of a photographing position of the photographed image, and a category of setting of the photographed image.

The control unit may analyze the number of persons included in the photographed image using a face recognition function and generate and store information on the number of persons included in the photographed image, and the image search UI may include a list of the category of the number of persons included in the photographed image.

The control unit may analyze a photographing mode of the photographed image and generate and store information on the photographing mode of the photographed image, and the image search UI may include a list of the category of the photographing mode of the photographed image.

The control unit may generate and store information on a photographing position of the photographed image using GPS (Global Positioning System) information during photographing of the photographed image, and the image search UI may include a list of the category of the photographing position of the photographed image.

The control unit may analyze the setting information of the photographed image and generate and store information on the setting information of the photographed image, and the image search UI may include a list of the category of the setting information of the photographed image.

The control unit may change at least one of the plurality of lists included in the image search UI to a list corresponding to another category according to a user's operation.

When one of a plurality of thumbnail images displayed on the image search UI is selected, the control unit may control the display unit to display an image corresponding to the selected thumbnail image through a full screen.

When one of a plurality of thumbnail images displayed on the image search UI is selected, the control unit may store an image corresponding to the selected thumbnail image in a preset storage area of the storage unit.

When a full search condition command is input, the control unit may search for and display, on the display unit, thumbnail images corresponding to one or more images that satisfy all search conditions of the plurality of categories.

When at least one search condition in the plurality of search condition menus is selected through a user's input and a search command is input, the control unit may display thumbnail images corresponding to one or more images that satisfy the selected search condition.

The above and/or other features and utilities of the present general inventive concept may also be achieved by providing a non-transitory computer-readable medium to contain computer-readable codes as a program to execute a method of providing a user interface (UI) in an image photographing apparatus, the method including photographing an image, analyzing the photographed image, and generating and storing information of the photographed image, and when a user command is input to generate an image search UI, displaying the image search UI that includes a plurality of lists corresponding to a plurality of categories using the information of the photographed image.

The above and/or other features and utilities of the present general inventive concept may also be achieved by providing an image photographing apparatus including a photographing unit to photograph an image, a display unit to display the photographed image, and a control unit to analyze the photographed image, to determine whether the photographed image corresponds to one of one or more search conditions of a category, and to generate an image search user interface (UI) to be displayed on the display unit, the image search UI including a thumbnail image corresponding to the photographed image and at least the one of the search conditions of the category.

The above and/or other features and utilities of the present general inventive concept may also be achieved by providing an image photographing apparatus including a photographing unit to photograph one or more images, a display unit to display the photographed images, and a control unit to controls the display to display an image search user interface (UI), the image search UI including a plurality of lists, each list having a category section with one or more search conditions, each list having an image section with one or more photographed images corresponding to one of the search condition.

The control unit may analyze the photographed image to determine whether the photographed image corresponds to one of the search conditions of each category such that the photographed image is displayed in the image section of the list having the corresponding category.

The displayed photographed image of the image section may include a thumbnail image of the photographed image.

The control unit may set one of the search conditions of the category, to determine the photographed image whether to correspond to the set search condition of the search conditions of the category, and to display the determined photographed image to be included in the corresponding image section of the corresponding list.

The image section may include at least one most recently photographed image or at least one oldest photographed image.

The control unit may set a priority on at least one of the photographed images, the search conditions, and the categories.

The image displayed in the image section of the list may be a still image or one image representing a moving image.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EXEMPLARY EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1:
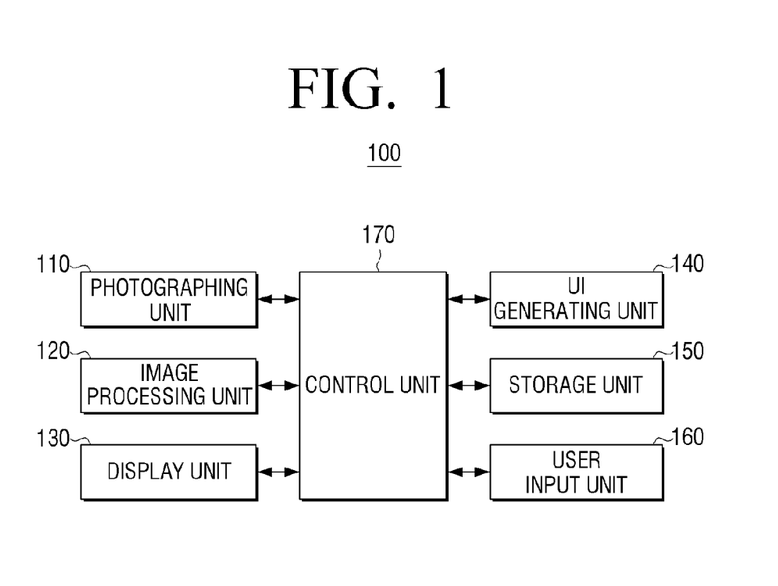
FIG. 1 is a block diagram illustrating an image photographing apparatus according to an embodiment of the present general inventive concept.

FIG. 1 is a block diagram illustrating an image photographing apparatus according to an embodiment of the present general inventive concept. As illustrated in FIG. 1, an image photographing apparatus 100 includes a photographing unit 110, an image processing unit 120, a display unit 130, a UI generating unit 140, a storage unit 150, a user input unit 160, and a control unit 170. According to an embodiment of the present general inventive concept, the image photographing apparatus 100 may be a digital camera. However, the image photographing apparatus 100 is not limited thereto. The image photographing apparatus 100 may be implemented by a mobile phone, a PDA, a tablet computer apparatus, a camcorder, or a TV apparatus, which has the photographing unit 110.

The image photographing apparatus 100 photographs one or more objects to generate an image corresponding to the photographed one or more objects. The photographing unit 100 may be disposed on a housing of the image photographing apparatus 100, and at least one of the above-described units may be disposed on or in a housing of the image photographing apparatus 100 to perform one or more functions of the image photographing apparatus 100. The image may be a still image or a moving image to be stored as a still image file or a moving image file. The photographing apparatus 100 may have a unit to select one still image from the moving image as a representative image representing the moving image (or moving image file). The still image and the representative image may be referred to as a photographed image.

The photographing unit 110 may include a shutter, a lens unit, an iris, a charge coupled device (CCD) image sensor, and an analog to digital converter (ADC). The shutter is a mechanism that adjusts the quantity of exposure light along with the iris. The lens unit processes an image upon receiving light from an external light source. In this case, the iris adjusts the quantity of incident light (incident light quantity) according to a degree of opening/closing thereof. The CCD image sensor accumulates the light quantity input through the lens unit, and outputs an image photographed by the lens unit according to the accumulated light quantity using a vertical synchronization signal. The image acquisition of the image photographing apparatus 100 is performed by the CCD image sensor which converts the light that is reflected from an object into an electrical signal. The image photographing apparatus 100 needs a color filter to obtain a color image using the CCD image sensor. A color filter array (CFA) may be used as the color filter. The CFA has a regularly arranged structure where a plurality of different color pixels are arranged such that only one color of the light with respect to the corresponding pixel can pass therethrough, and various types of CFAs may be provided according to their arrangement structures. The ADC converts an analog image signal output from the CCD image sensor into a digital signal.

On the other hand, the image photographing through the photographing unit 110 as described above is merely exemplary, and the image may be photographed by other methods. For example, the image may be photographed using a complementary metal oxide semiconductor (CMOS) image sensor rather than the CCD image sensor.

The image processing unit 120 performs signal processing so that raw image data corresponding to the digital signal can be displayed according to the control of the control unit 170. The image processing unit 120 may remove a black level that is caused by a current generated in the CCE image sensor that is sensitive to a temperature change and the CFA filter. The image processing unit 120 performs gamma correction for encoding information to compensate for the non-linearity of a human viewing angle. The image processing unit 120 may perform CFA interpolation that interpolates a Bayer pattern implemented by an RGRG line and a GBGB line of predetermined gamma-corrected data. The image processing unit 12 converts the interpolated RGB signal into a YUV signal, performs edge compensation to process a clear image through filtering of a Y signal through a high band-pass filter, performs color correction to correct color values of U and V signals using a standard color coordinate system, and removes noises thereof. The image processing unit 120 may compress and process the noise-removed Y, Y, and V signals to generate a JPEG file, which is displayed through the display unit 130, is stored in the storage unit 150, and/or is transmitted to an outside of the image photographing apparatus 100 through an interface (not illustrated) connectable to the outside using a wired or wireless communication.

On the other hand, the above-described image processing through the image processing unit 120 is merely exemplary, and the image may be processed by other methods.

The display unit 130 displays image data processed by the image processing unit 120 or image data stored in the storage unit 150. Further, the display unit 130 displays a user interface (UI) generated by a UI generating unit 140. The display unit 130 may display a thumbnail image list that includes a plurality of thumbnail images corresponding to a plurality of image data according to the control of the control unit 170. The display unit may display an image being photographed by the photographing unit 110. The display unit displays one of the image, the image data, and the UI according to a user selection.

The control unit 170 may control the UI generating unit 140 to generate a signal corresponding to a UI in the form of an on screen display (OSD). The UI may be displayed on a screen of the display unit 130. The UI generating unit 140 may generate an image search UI to search for an image photographed by a photographing unit 110. In this case, the image search UI includes a plurality of lists corresponding to a plurality of categories. Here, the plurality of categories include at least one of a category of the number of persons included in the photographed image, a category of a mode of the photographed image, a category of a photographing position of the photographed image, and a category of setting of the photographed image.

The storage unit 150 stores therein programs to drive the image photographing apparatus 100 and data corresponding to an operation of the image photographing apparatus 100, and stores image data processed by the image processing unit 120. Further, the storage unit 150 stores information on an image that is analyzed by the control unit 170.

The user input unit 160 receives an input of a user command. In this case, the user input unit 160 may be implemented by a shutter, buttons, and a touch screen. The user input unit 160 may be provided on housing of the image photographing apparatus 100. The user input unit 160 may be a touch screen of the display unit 130 to input a user command to control the function of the image photographing apparatus 100.

The control unit 170 controls an operation of the image photographing apparatus 100 according to the user command input through the user input unit 160. The control unit 170 may analyze an image photographed by the photographing unit 110, generate information of the photographed image, and store the generated information in the storage unit 150. In this case, the information of the photographed image includes at least one of a number of persons included in the photographed image, a photographing mode of the photographed image, a photographing position of the photographed image, and setting information of the photographed image.

The information may be one or more characteristics of one or more first objects of the photographed image, one or more characteristics of one or more second objects disposed around the one or more first objects of the photographed image, one or more characteristics of one or more environments at a time of a photographing operation of the image photographing apparatus 100, one or more characteristics of one or more photographing conditions corresponding to how to drive mechanical structures of the image photographing apparatus 100, one or more characteristics of one or more processing methods of how to process the photographed image, and/or one or more characteristics of one or more user preferences corresponding to the operation of the image photographing apparatus 100.

The control unit 170 analyzes the number of persons included in the photographed image by using a face recognition technology, for example. The control unit 170 analyzes the number of persons through recognition of faces of the persons included in the photographed image. The control unit 170 may detect specified regions (for example, eyes) of the persons through analysis of pixels of the photographed image. The faces of the persons included in the photographed image may also be recognized by using other methods different from the above-described method according to an embodiment thereof. Then, the control unit 170 may store information on the number of persons analyzed in the storage unit 150 as an index of the photographed image.

Further, the control unit 170 may analyze a photographing mode of the photographed image through analysis of the photographing mode set at a time of photographing. That is, if an image is photographed, the control unit may confirm or determine the photographing mode at the time of photographing as the photographing mode of the photographed image. Then, the control unit 170 may store the information on the photographing mode in the storage unit 150 as an index of the photographed image.

Further, the control unit 170 may analyze the photographing position of the photographed image using GPS information at the time of photographing. That is, the control unit 170 may confirm or determine the photographing position through analysis of the GPS information at the time of photographing the image. Further, the control unit 170 may store the information on the photographing position in the storage unit 150 as an index of the photographed image. In this case, the image photographing apparatus 100 may have a communication unit (not illustrated) to communicate with an external device to receive the GPS information through an interface (not illustrated). The control unit 170 may analyze setting information of the photographed image through analysis of various kinds of setting information at the time of photographing. In this case, the setting information may include ISO values of the photographed image, whether the photographed image is a still image or a moving image, whether the photographed image was flashed, and the like. However, this is merely exemplary, and the present general inventive concept can be applied to other setting information of the photographed image. Further, the control unit 170 may store the analyzed setting information in the storage unit 150 as an index of the photographed image.

When a user command is input through the user input unit 160 to generate an image search UI, the control unit 170 controls the display unit 130 to display the image search UI to search for one or more photographed images using the information of the photographed image stored in the storage unit 150.

Figure 2:
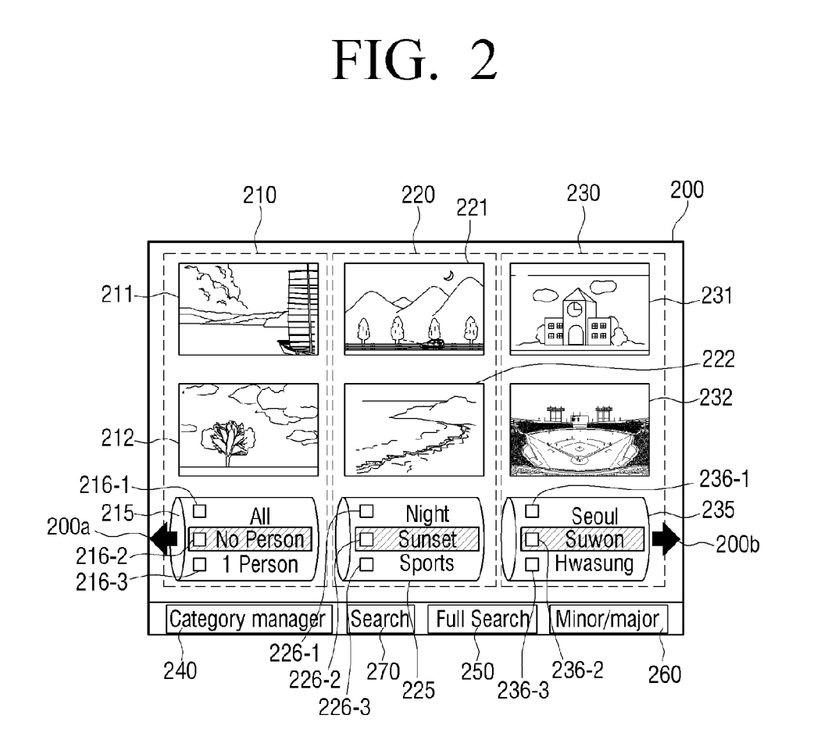
FIGS. 2 to 6 are diagrams illustrating an image search UI according to an embodiment of the present general inventive concept.

An image search UI 200 is illustrated in FIG. 2 as an example of the image search UI generated in the UI generating unit 140 to be displayed on a screen of a display unit, for example, the display unit 130.

The photographed image may be an image taken by the image photographing apparatus 100 and/or an image received from an external device and stored in the storage unit 150. In this case, the image photographing apparatus 100 may include an interface to communicate with the external device using a wired or wireless communication.

The image search UI 200 includes a plurality of lists corresponding to a plurality of categories. For example, the image search UI 200, as illustrated in FIG. 2, may include a first list 210 of a category of the number of persons, a second list 220 of a category of a photographing mode, and a third list 230 of a category of a photographing position. Hereinafter, the first, second, third lists 210, 220, and 230 are referred to as a plurality of lists 210, 220, and 230.

Each of the plurality of lists 210, 220, and 230 includes a search condition menu to change (or set) a search condition in the corresponding category and one or more thumbnail images corresponding to one or more images that satisfy the first search condition changed by the search condition menu. For example, the first list 210 includes a first search condition menu 215 to change (or set) a first search condition of the number of persons and thumbnail images 211 and 212 of images that satisfy the first search condition (for example, an image including no person) set by the first search condition menu. The first search condition may include "all" corresponding to all images regardless of the number of persons, "no person" corresponding to an image without a person, and "1 person" corresponding to an image including a person.

Further, the second list 220 includes a second search condition menu 225 to change (or set) a second search condition of the photographing mode and thumbnail images 221 and 222 of one or more images that may satisfy the second search condition (for example, an image corresponding to a sunset mode) set by the second search condition menu. The second search condition may include "night" corresponding to an image taken in a night mode or at night, "sunset" corresponding to an image taken at a sunset mode or at an sunset, and "sports" corresponding to an image taken in a sports mode or at a sports game.

Further, the third list 230 includes a third search condition menu 235 to change (or set) the search condition of the photographing position and thumbnail images 231 and 232 of one or more images that satisfy the search condition (for example, an image corresponding to an area name, Suwon) set by the third search condition menu. The third search condition may include "Seoul" corresponding to an image taken in an area of "Seoul," "Suwon" corresponding to an image taken in an area of "Suwon," and "Hwasung" corresponding to an image taken in an area of "Hwasung."

The search condition menus 215, 225, and 235 may not display all search conditions. That is, the search condition menu 215, 225, or 235 may have a first portion of the search conditions displayed on a screen of the image search UI 220 and a second portion of the search conditions which is not displayed on the screen of the image search UI 220. In this case, the image search UI 220 may have an icon or button to enable the second portion to be displayed according to a scrolling or selection operation of the image search UI 220. For example, the first search condition menu 215 is displayed with the first search conditions, for example, all, no person, and 1 person. However, first search conditions may include 2 persons or 3 persons, for example, which can be displayed according to the scrolling or selection operation.

The list 210, 220, or 230 may display a most recently photographed image to be disposed at a position closest to the corresponding search condition menu 215, 225, or 235. It is possible that a previously photographed image can be moved to a next position to provide a space to display the most recently photographed image according to a presence of the most recently photographed image. It is possible that a previously photographed image can be disappeared from the screen and another previously photographed image can be shifted to a position of the previously photographed image such that the most recently photographed image can be displayed. However, the disappeared image can be seen by scrolling a corresponding portion of the list or the image of the list.

The search conditions of the first search condition menu 215 may not be exclusive from each other. That is, the search condition of 2 persons may include the search condition of 1 person. The search conditions of the second search condition menu 225 may be overlap or exclusive. That is, the search condition of night may include the search condition of sports. The search condition of the third search condition menu 235 may be exclusive from each other. That is, the search condition of Seoul may be exclusive from the search condition of Suwon.

Here, a plurality of search condition menus 215, 225, and 235 included in the plurality of lists 210, 220, and 230, as illustrated in FIG. 2, include check boxes 216-1, 216-2, 216-3, 226-1, 226-2, 226-3, 236-1, 236-2, and 236-3 that correspond to the search conditions. Accordingly, if at least one search condition in the plurality of search condition menus 215, 225, and 235 included in the plurality of lists 210, 220, and 230 is selected, a check (v) is marked in a check box included in the at least one selected search condition menu.

Further, if a search icon 270 is selected, the control unit 170 may display thumbnail images corresponding to images that satisfy the at least one selected search condition. For example, if "1 person" is selected in the first search condition menu 215, "sunset" is selected in the second search condition menu 225, and the search icon 270 is selected, the control unit 170 may search for one or more images of a plurality of images stored in the storage unit 150, which correspond to one person and the sunset mode, and display thumbnail images corresponding to the searched one or more images. In this case, it is possible that none of third search conditions of the third search condition menu 235 is selected.

When two or more search conditions are selected in one search condition menu, the control unit 170 may display thumbnail images corresponding to one or more images that satisfy either one of the selected search conditions. For example, if "1 person" is selected in the first search condition menu 215, "2 persons" is selected in the first search condition menu 215, and the search icon 270 is selected, the control unit 170 may search for one or more images of a plurality of images stored, which correspond to one person or two persons, and display thumbnail images corresponding to the searched one or more images.

Further, the image search UI 200 may include a category manager icon 240 to change at least one of the plurality of lists 210, 220, and 230 included in the image search UI 200 to a list corresponding to another category, a full search icon 250 to search for an image that satisfies all category conditions, an icon 260 to search for a condition having a maximum value or a minimum value for each category, and the search icon 270 to initiate a searching operation such that the control unit 170 starts searching for an image that satisfies the selected category condition.

When a user command is input through the user input unit 160 to generate the image search UI 200, the control unit 170 may control the search condition so that the initial search condition becomes the search condition on which the number of photographed images is maximized.

For example, the control unit 170 may control the search condition such that the search condition of the first list corresponding to the category of the initial number of persons becomes the search condition to maximize the number of photographed image and to set the number of persons zero (0). In this case, this search condition may be set as a higher priority than that of other search condition.

Figure 3:
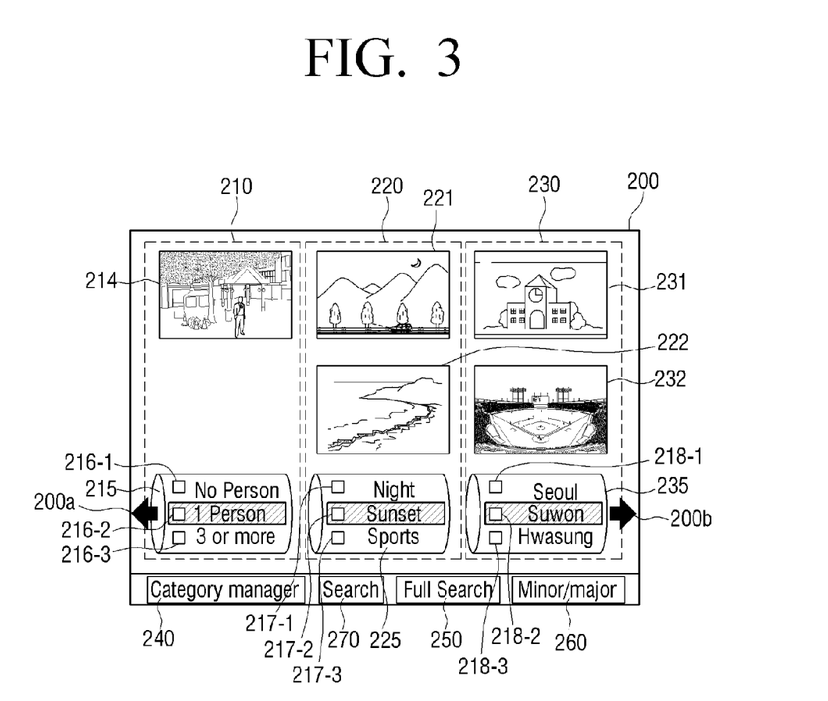

Then, the control unit 170 may change the search conditions of the respective lists using the search condition menu of the image search UI 220. For example, the control unit 170 may changes the search condition such that the search condition corresponds to a photographed image in which one person is included, as illustrated in FIG. 3, through scrolling of the first search condition menu 215 displayed on the first list 210.

Figure 4:
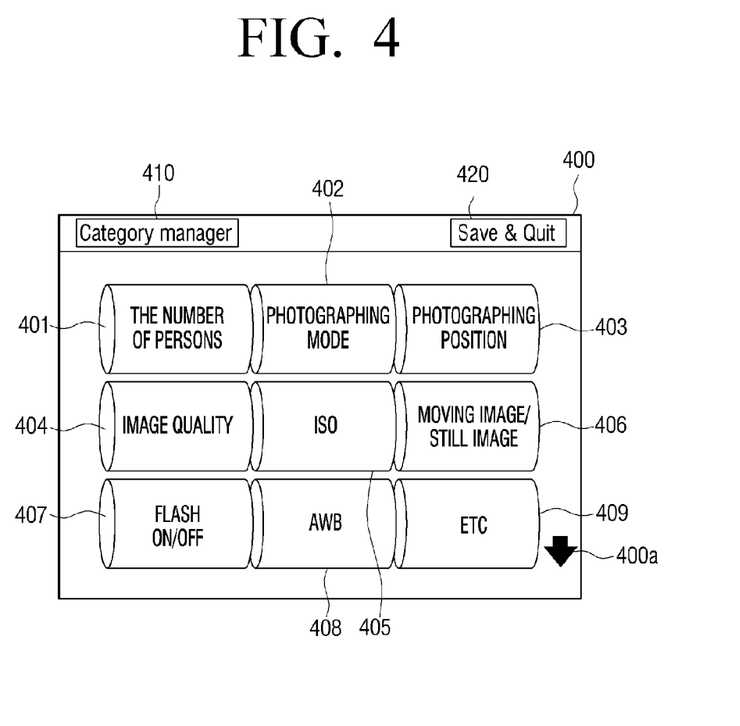

Further, the control unit 160 may change at least one of the plurality of lists 210, 220, and 230 included in the image search UI 200 to a list corresponding to another category using the category manager icon 240. For example, if the category manager icon 240 as illustrated in FIG. 2 is selected, the control unit 170 may display a category manager UI 400 as illustrated in FIG. 4.

The category manager UI 400 includes icons 401, 402, and 403 corresponding to the currently set categories, icons 404, 405, 406, 407, 408, and 409 corresponding to the categories that are not currently set, an image search icon 410 that returns to the image search UI 200, and a storage icon 420 to store the setting of the category manager UI 400 in the storage unit 150 of the image photographing apparatus 100. Here, the categories that are not currently set may include a category of image quality information, a category of an ISO value, a category of the kind of an image, a category of flash on/off information, and a category of AWB (Auto White Balancing) information.

On the category manager UI 400, the icons 401, 402, and 403 corresponding to the currently set category are displayed differently from the icons 404, 405, 406, 407, 408, and 409 corresponding to the categories that are not currently set. Further, by selecting two categories to be changed through the user input unit 160, the control unit 170 may change the currently set category to the category that is not currently set. For example, if the photographing mode icon 402 and the image quality icon correspond to each other, the control unit 170 may change the category of the photographing mode to the category of the image quality as the category to be displayed on the image search UI 200.

The category manager UI 400 may include an icon or a button 410a and/or 410b such that another category can be displayed on a screen of the category manager UI 400 in addition to the displayed categories according to a selection or touch of the icon 410a or 410b. It is possible that the displayed categories may be changed to a smaller size to accommodate another category, which was not displayed on the screen thereof. It is also possible that a certain number of the displayed categories is disappeared from the screen to provide a space to display another category which was not displayed on the screen thereof.

According to a selection or touch of the list displayed in the category manager UI 400, a name of the category can be changed, the search condition can be changed, and/or a new condition can be set or added to the existing search condition. The setting thereof can be stored in the storage unit 150, and when the category manager UI 400 is selected, the category manager UI 400 is displayed according to the stored setting.

Referring back to FIG. 2, when one of thumbnail images included in the image search UI 200 is selected in a state where the image search UI 200 is displayed, the control unit 170 may display the image corresponding to the selected thumbnail image through a full screen. For example, as illustrated in FIG. 2, if the first thumbnail image 211 of the first list 210 is selected (for example, if the first thumbnail image is touched once) in a state where the image search UI 200 is displayed, the control unit 170, as illustrated in FIG. 5, displays the image corresponding to the first thumbnail image 211 through a full screen.

Figure 5:
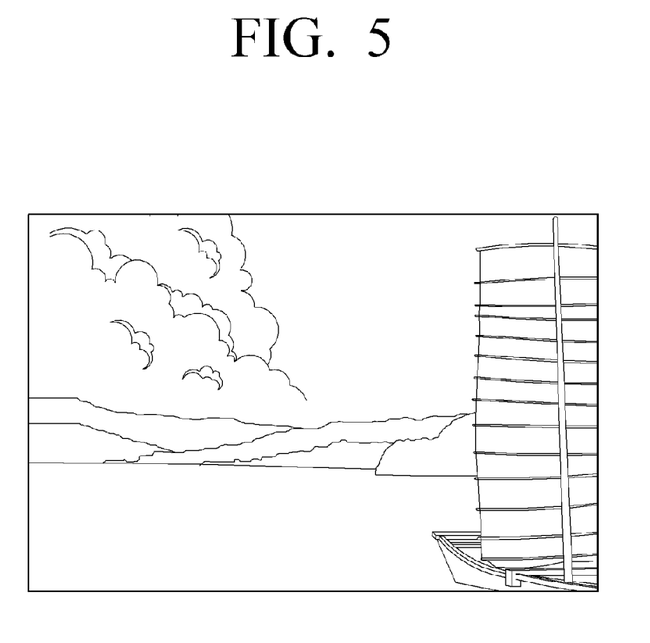

When the image corresponding to the selected thumbnail image is a representative image representing a moving image (or a moving image file), the representative image or the moving image corresponding to the stored moving image file may be displayed on a screen of the image search UI 200 of FIG. 5

Figure 6:
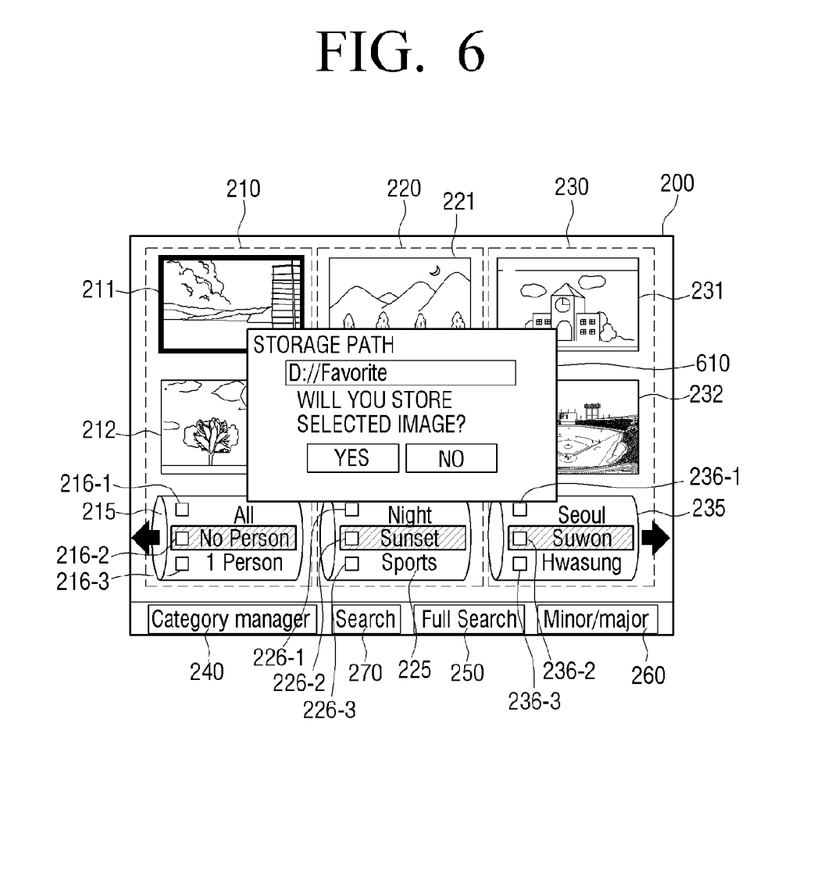

Further, as illustrated in FIG. 2, if at least one of thumbnail images included in the image search UI 200 is selected in a state where the image search UI 200 is displayed, the control unit 170 may store an image corresponding to the selected thumbnail image in a specified area (for example, FAVORATE folder) of the storage unit 150. For example, as illustrated in FIG. 2, if the first thumbnail image 211 of the first list 210 is selected (for example, if the first thumbnail image is continuously touched twice) in a state where the image search UI 200 is displayed, the control unit 170, as illustrated in FIG. 6, displays a storage inquiry message 610 for inquiring whether to store the image corresponding to the first thumbnail image 211 in the specified area. Then, if a user command is input in response to the storage inquiry message 610, the control unit 170 may store the image corresponding to the first selected thumbnail image 211 in the specified storage area.

The image search UI 200 may display an image to select and display an image stored in the favorite folder or a specific area of the storage unit 150. The image search UI 200 may include a mark (not illustrated) indicating the image of the favorite folder. The mark may be displayed in the corresponding image. According to the selection or touch of the mark of the corresponding image, the corresponding image can be displayed as illustrated in FIG. 5.

The image search UI 200 may include an icon or button 200a and/or 200b such that another list can be displayed in a screen of the image search UI 200 according to a selection or touch of the icon 200a or 200b. In this case, the displayed lists can be changed in size (or become smaller) to accommodate the display of another list. It is possible that one of the displayed lists is disappeared and another list is inserted into and displayed in the screen of the image search UI 200. One of the icons 200a and 200b can be used to show another list disposed, displayed, or arranged on a side of the displayed lists according to arrangement of the lists of the category manager menu UI 400. When three category icons are displayed in the image search UI 200, another list may be on disposed, displayed, or arranged on a side of at least one of the three category icons in the category manager menu UI 400. When the three category icons are icons 401, 402, and 403, an icon 409 may be displayed according to a selection of the icon 200a. It is possible that when the three category icons are icons 401, 402, and 403, no category icon is added or displayed according to a selection of the icon 200a since the category icon 401 is a last icon, for example, a top left icon, arranged in the category manager menu UI 400.

As described above, through the image photographing apparatus 100, the user can search for images desired by the user on the basis of various categories.

Figure 7:
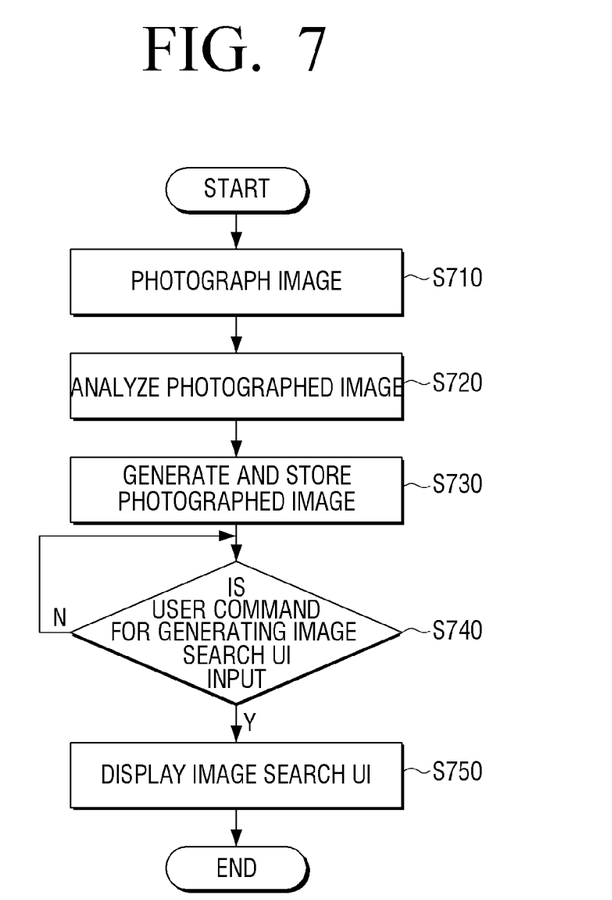
FIG. 7 is a flowchart illustrating a method of providing thumbnail images according to an embodiment of the present general inventive concept.

FIG. 7 illustrates a method of providing a UI in the image photographing apparatus 100.

First, the image photographing apparatus 100 photographs an image through the photographing unit 110 at operation S710.

The image photographing apparatus 100 analyzes the photographed image at operation S720. The image photographing apparatus 100 may analyze the number of persons included in the photographed image using a face recognition technology. Further, the image photographing apparatus 100 may analyze a photographing mode and setting information using the photographing information at the time of photographing. Further the image photographing apparatus 100 may analyze a photographing position of the photographed image using global positioning system (GPS) information.

The image photographing apparatus 100 may have an interface (not illustrated) to communicate with a GPS information system to receive information on the photographing position. Here, the information of the photographing position may be a location of the image photographing apparatus 100 or a location of an object focused and photographed by the image photographing apparatus 100. The object may be included in the photographed image. In this case, the control unit 170 may have a function to process the GPS information according to the receive GPS information to indicate the photographing position of the object or image photographing apparatus 100.

Further, the image photographing apparatus 100 generates and stores image information of the photographed image using the result of analysis at operation S730. In this case, the image information of the photographed image includes information on the number of persons included in the photographed image, photographing mode information of the photographed image, photographing position information of the photographed image, and setting information of the photographed image.

The image searching method of the image photographing apparatus 100 may include determining whether a user command is input to generate an image search UI at operation S740. In this case, the image photographing apparatus 100 may input the user command to generate the image search UI through buttons provided on the image photographing apparatus 100 or through a menu displayed on the display unit 130 of the image photographing apparatus 100.

When the user command is input to generate the image search UI at operation S740-Y, the image photographing apparatus 100 displays the image search UI using the photographed image information at operation S750.

In this case, as illustrated in FIG. 2, the image search UI 200 includes a plurality of lists corresponding to a plurality of categories, respectively. Here, the plurality of lists, as illustrated in FIG. 2, include a search condition menu to change or set a search condition in the corresponding category and thumbnail images of one or more images that can satisfy the search condition changed by the search condition menu.

When the user command is input through the user input unit 160 to generate the image search UI 200, the image photographing apparatus 100 may control the search condition such that the initial search condition becomes the search condition in which the number of photographed images is maximized. Further, the image photographing apparatus 100 may change the search conditions of the respective lists using the corresponding search condition menu of the image search UI 220.

Further, the image photographing apparatus may change at least one of the plurality of lists 210, 220, and 230 included in the image search UI 200 to a list corresponding to another category according to the user command.

When one of thumbnail images included in the image search UI 200 is selected (for example, if the thumbnail image is touched once) in a state where the image search UI 200 is displayed, the image photographing apparatus 100 may display the image corresponding to the selected thumbnail image through a full screen. When one of thumbnail images included in the image search UI 200 is selected (for example, if the thumbnail image is continuously touched twice) in a state where the image search UI 200 is displayed, the image photographing apparatus 100 may store the image corresponding to the selected thumbnail image in a specified area (for example, FAVORATE folder) of the storage unit 150.

Through the method of providing a UI as described above, the user may search for images desired by the user on the basis of various categories. The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), EPROM, EEPROM, a register, a removable disk, a memory card, a USB memory, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of providing a user interface (UI) in an image photographing apparatus, the method comprising:
    photographing an image;
    analyzing the photographed image, and generating and storing information of the photographed image;
    when a user command is input to generate an image search UI, displaying the image search UI that includes a plurality of lists corresponding to a plurality of categories using the information of the photographed image,
    wherein each of the plurality of lists displays a search condition menu to change a search condition in the corresponding category, and thumbnail images of one or more images that satisfy the search condition changed by the search condition menu, and
    wherein the search condition menu of each displayed list is different.

2. The method of claim 1, wherein, when the user command is input to generate the image search UI, the search condition is selected in the search condition menu to maximize the number of photographed images or to minimize the number of photographed images.

3. The method of claim 1, wherein:
    the plurality of categories comprise at least one of a category of the number of persons included in the photographed image, a category of a mode of the photographed image, a category of a photographing position of the photographed image, and a category of the setting of the photographed image.

4. The method of claim 3, wherein:
    the generating and storing of the information of the photographed image includes analyzing the number of persons included in the photographed image using a face recognition function, and generating and storing information on the number of persons included in the photographed image; and
    the image search UI comprises a list of the category of the number of persons included in the photographed image.

5. The method of claim 3, wherein:
    the generating and storing the information of the photographed image includes analyzing a photographing mode of the photographed image, and generating and storing information on the photographing mode of the photographed image; and
    the image search UI comprises a list of the category of the photographing mode of the photographed image.

6. The method of claim 3, wherein:
    the generating and storing the information of the photographed image includes generating and storing information on a photographing position of the photographed image using global positioning system information during photographing of the photographed image; and
    the image search UI comprises a list of the category of the photographing position of the photographed image.

7. The method of claim 3, wherein:
    the generating and storing the information of the photographed image includes analyzing the setting information of the photographed image, and generating and storing information on the setting information of the photographed image; and
    the image search UI comprises a list of the category of the setting information of the photographed image.

8. The method of claim 1, further comprising:
    changing at least one of the plurality of lists included in the image search UI to a list corresponding to another category according to a user's operation.

9. The method of claim 1, further comprising:
    when one of a plurality of thumbnail images displayed on the image search UI is selected, displaying an image corresponding to the selected thumbnail image through a full screen.

10. The method of claim 1, further comprising:
    when one of a plurality of thumbnail images displayed on the image search UI is selected, storing an image corresponding to the selected thumbnail image in a preset storage area.

11. The method of claim 1, further comprising:
    when a full search condition command is input, displaying thumbnail images corresponding to one or more images that satisfy all search conditions of the plurality of categories.

12. An image photographing apparatus comprising:
a photographing unit to photograph an image;
a storage unit to store the photographed image and information of the photographed image;
a display unit; and
a control unit to analyze the image photographed by the photographing unit, to generate the information of the photographed image, and when a user command is input to generate an image search UI, controlling the display unit to display the image search UI that comprises a plurality of lists corresponding to a plurality of categories using the information of the photographed image,
wherein each of the plurality of lists displays a search condition menu to change a search condition in the corresponding category, and thumbnail images of one or more images that satisfy the search condition changed by the search condition menu, and
wherein the search condition menu of each displayed list is different.

13. The image photographing apparatus of claim 12, wherein when the user command is input to the image search UI, the search condition is selected in the search condition menu to maximize the number of photographed images or to minimize the number of photographed images.

14. The image photographing apparatus of claim 12, wherein the plurality of categories comprise at least one of a category of the number of persons included in the photographed image, a category of a mode of the photographed image, a category of a photographing position of the photographed image, and a category of setting of the photographed image.

15. The image photographing apparatus of claim 14, wherein:
the control unit analyzes the number of persons included in the photographed image using a face recognition function, and generates and stores information on the number of persons included in the photographed image, and
the image search UI comprises a list of the category of the number of persons included in the photographed image.

16. The image photographing apparatus of claim 14, wherein:
the control unit analyzes a photographing mode of the photographed image, and generates and stores information on the photographing mode of the photographed image, and
the image search UI comprises a list of the category of the photographing mode of the photographed image.

17. The image photographing apparatus of claim 14, wherein:
the control unit generates and stores information on a photographing position of the photographed image using GPS (Global Positioning System) information during photographing of the photographed image, and
the image search UI comprises a list of the category of the photographing position of the photographed image.

18. The image photographing apparatus of claim 14, wherein:
the control unit analyzes the setting information of the photographed image, and generates and stores information on the setting information of the photographed image, and
the image search UI comprises a list of the category of the setting information of the photographed image.

19. The image photographing apparatus of claim 12, wherein the control unit changes at least one of the plurality of lists included in the image search UI to a list corresponding to another category according to a user's operation.

20. The image photographing apparatus of claim 12, wherein, when one of a plurality of thumbnail images displayed on the image search UI is selected, the control unit controls the display unit to display an image corresponding to the selected thumbnail image through a full screen.

21. The image photographing apparatus of claim 12, wherein, when one of a plurality of thumbnail images displayed on the image search UI is selected, the control unit stores an image corresponding to the selected thumbnail image in a preset storage area of the storage unit.

22. The image photographing apparatus of claim 12, wherein, when a full search condition command is input, the control unit searches for and displays, on the display unit, thumbnail images corresponding to one or more images that satisfy all search conditions of the plurality of categories.

23. A non-transitory computer-readable medium to contain computer-readable codes as a program to execute a method of providing a user interface (UI) in an image photographing apparatus, the method comprising:
photographing an image;
analyzing the photographed image, and generating and storing information of the photographed image;
when a user command is input to generate an image search UI, displaying the image search UI that includes a plurality of lists corresponding to a plurality of categories using the information of the photographed image,
wherein each of the plurality of lists displays a search condition menu to change a search condition in the corresponding category, and thumbnail images of one or more images that satisfy the search condition changed by the search condition menu, and
wherein the search condition menu of each displayed list is different.

24. An image photographing apparatus comprising:
a photographing unit to photograph an image;
a display unit to display the photographed image; and
a control unit to analyze the photographed image, to determine whether the photographed image corresponds to one of one or more search conditions of a category, and to generate an image search user interface (UI) to be displayed on the display unit, the image search UI including a thumbnail image corresponding to the photographed image and at least the one of the search conditions of the category,
wherein each of the plurality of lists displays a search condition menu to change a search condition in the corresponding category, and thumbnail images of one or more images that satisfy the search condition changed by the search condition menu, and
wherein the search condition menu of each displayed list is different.

25. An image photographing apparatus comprising:
a photographing unit to photograph one or more images;
a display unit to display the photographed images; and
a control unit to control the display to display an image search user interface (UI), the image search UI including a plurality of lists, each list having a category section with one or more search conditions, each list having an image section with one or more photographed images corresponding to one of the search condition,
wherein each of the plurality of lists displays a search condition menu to change a search condition in the corresponding category, and thumbnail images of one or more images that satisfy the search condition changed by the search condition menu, and
wherein the search condition menu of each displayed list is different.

26. The image photographing apparatus of claim 25, wherein the control unit analyzes the photographed image to determine whether the photographed image corresponds to one of the search conditions of each category such that the photographed image is displayed in the image section of the list having the corresponding category.

27. The image photographing apparatus of claim 25, wherein the displayed photographed image of the image section comprises a thumbnail image of the photographed image.

28. The image photographing apparatus of claim 25, wherein the control unit sets one of the search conditions of the category, to determine the photographed image whether to correspond to the set search condition of the search conditions of the category, and to display the determined photographed image to be included in the corresponding image section of the corresponding list.

29. The image photographing apparatus of claim 25, wherein the image section includes at least one most recently photographed image or at least one oldest photographed image.

30. The image photographing apparatus of claim 25, wherein the control unit sets a priority on at least one of the photographed images, the search conditions, and the categories.

31. The image photographing apparatus of claim 25, wherein the image displayed in the image section of the list may be a still image or one image representing a moving image.

32. The method of claim 1, wherein:
the analyzing of the photographed image comprises analyzing one or more objects included in the photographed image and a characteristic of the photographed image, and
the generating and storing information of the photographed image comprises generating and storing information of the photographed image according to the analyzed one or more objects and characteristic of photographed image.

33. The method of claim 32, wherein:
the one or more objects comprise at least one person included in the photographed image; and
the characteristic of the photographed image comprises at least one of a mode of the photographed image, a photographing position of the photographed image, and setting of the photographed image.

34. The image photographing apparatus of claim 12, wherein the control unit analyzes one or more objects included in the photographed image and a characteristic of the image photographed by the photographing unit, generates the information of the photographed image according to the analyzed one or more objects and characteristic of the photographed image, and when a user command is input to generate an image search UI, controlling the display unit to display the image search UI that comprises a plurality of lists corresponding to a plurality of categories using the information of the photographed image.

35. The non-transitory computer-readable medium of claim 23, wherein:
analyzing of the photographed image comprises analyzing one or more objects included in the photographed image and a characteristic of the photographed image, and
the generating and storing information of the photographed image comprises generating and storing information of the photographed image according to the analyzed one or more objects and characteristic of photographed image.

36. The image photographing apparatus of claim 24, wherein the control unit analyzes one or more objects included in the photographed image and a characteristic of the photographed image, to determine whether the photographed image corresponds to one of one or more search conditions of a category according to the analyzed one or more objects and characteristic of the photographed image, and generates an image search user interface (UI) to be displayed on the display unit, the image search UI including a thumbnail image corresponding to the photographed image and at least the one of the search conditions of the category.

37. The image photographing apparatus of claim 25, wherein the control unit automatically generates information according to one or more objects included in the photographed image and a characteristic of each of the one or more photographed images and controls the display to display an image search user interface (UI), the image search UI including a plurality of lists, each list having a category section with one or more search conditions, each list having an image section with one or more photographed images corresponding to one of the search condition according to the information.

38. The image photographing apparatus of claim 37, wherein the control unit analyzes the one or more objects and the characteristic of the photographed image to determine whether the one or more objects and characteristic of the photographed image correspond to at least one of the search conditions of each category such that the photographed image is displayed in the image section of the list having the corresponding category.

* * * * *